United States Patent
Kim et al.

(10) Patent No.: US 12,327,870 B2
(45) Date of Patent: Jun. 10, 2025

(54) SULFUR-CARBON COMPOSITE, POSITIVE ELECTRODE FOR LITHIUM SECONDARY BATTERY INCLUDING SAME, AND LITHIUM SECONDARY BATTERY

(71) Applicant: LG ENERGY SOLUTION, LTD., Seoul (KR)

(72) Inventors: Soohyun Kim, Daejeon (KR); Jangsoo Lee, Daejeon (KR); Kihyun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 652 days.

(21) Appl. No.: 17/607,788

(22) PCT Filed: Jul. 2, 2020

(86) PCT No.: PCT/KR2020/008671
§ 371 (c)(1),
(2) Date: Oct. 29, 2021

(87) PCT Pub. No.: WO2021/002703
PCT Pub. Date: Jan. 7, 2021

(65) Prior Publication Data
US 2022/0216476 A1    Jul. 7, 2022

(30) Foreign Application Priority Data

Jul. 2, 2019   (KR) .................. 10-2019-0079364
Jul. 2, 2020   (KR) .................. 10-2020-0081369

(51) Int. Cl.
*H01M 4/583*       (2010.01)
*H01M 4/02*        (2006.01)
(Continued)

(52) U.S. Cl.
CPC ......... *H01M 4/583* (2013.01); *H01M 4/0402* (2013.01); *H01M 4/364* (2013.01);
(Continued)

(58) Field of Classification Search
CPC .... H01M 4/583; H01M 4/0402; H01M 4/364; H01M 4/38; H01M 4/604; H01M 4/13;
(Continued)

(56) References Cited

U.S. PATENT DOCUMENTS

2011/0008531 A1*   1/2011   Mikhaylik .............. H01M 4/62
                                                        427/77
2017/0352913 A1   12/2017   Lecuyer et al.
(Continued)

FOREIGN PATENT DOCUMENTS

CN    105304958 A    2/2016
CN    106159221 A   11/2016
(Continued)

OTHER PUBLICATIONS

Hernandez et al., "Redox-active polyimide-polyether block copolymers as electrode materials for lithium batteries," 2015, RSC Adv., 5, 17096-17103. (Year: 2015).*
(Continued)

*Primary Examiner* — Matthew W Van Oudenaren
(74) *Attorney, Agent, or Firm* — Birch, Stewart, Kolasch & Birch, LLP

(57) ABSTRACT

Disclosed is a sulfur-carbon composite, a method for manufacturing the same, and a positive electrode for a lithium secondary battery and a lithium secondary battery including the same, which has excellent reactivity and lifetime characteristics and has an effect of reducing overvoltage.

10 Claims, 6 Drawing Sheets

(51) Int. Cl.
  *H01M 4/04*     (2006.01)
  *H01M 4/36*     (2006.01)
  *H01M 4/38*     (2006.01)
  *H01M 4/60*     (2006.01)
  *H01M 10/0525*  (2010.01)

(52) U.S. Cl.
  CPC ............ *H01M 4/38* (2013.01); *H01M 4/604* (2013.01); *H01M 10/0525* (2013.01); *H01M 2004/021* (2013.01); *H01M 2004/028* (2013.01)

(58) Field of Classification Search
  CPC ........ H01M 4/139; H01M 4/366; H01M 4/62; H01M 4/625; H01M 4/133; H01M 4/137; H01M 4/1393; H01M 4/1399; H01M 4/362; H01M 4/58; H01M 4/581; H01M 4/5815; H01M 4/587; H01M 4/602; H01M 4/606; H01M 4/608; H01M 10/0525; H01M 10/052; H01M 2004/021; H01M 2004/028
  See application file for complete search history.

(56) References Cited

U.S. PATENT DOCUMENTS

| | | | |
|---|---|---|---|
| 2018/0351198 A1* | 12/2018 | Zhamu | H01M 4/625 |
| 2019/0067682 A1 | 2/2019 | Cho et al. | |
| 2019/0245203 A1* | 8/2019 | Cho | H01M 10/0525 |
| 2020/0028172 A1 | 1/2020 | Deschamps et al. | |
| 2020/0176775 A1 | 6/2020 | Kim et al. | |
| 2021/0184215 A1 | 6/2021 | Kim et al. | |

FOREIGN PATENT DOCUMENTS

| | | | |
|---|---|---|---|
| CN | 107768643 A | | 3/2018 |
| CN | 109314228 A | | 2/2019 |
| EP | 0 333 861 A1 | | 9/1989 |
| EP | 3 451 425 A2 | | 3/2019 |
| JP | 2019-509613 A | | 4/2019 |
| KR | 90-005620 B1 | | 7/1990 |
| KR | 10-2017-0092685 A | | 8/2017 |
| KR | 10-2018-0017724 A | | 2/2018 |
| KR | 10-2018-0048309 A | | 5/2018 |
| KR | 10-1936826 B1 | | 1/2019 |
| KR | 10-2019-0011943 A | | 2/2019 |
| KR | 10-2019-0047903 A | | 5/2019 |
| KR | 10-2019-0047907 A | | 5/2019 |
| KR | 10-1990616 B1 | | 6/2019 |
| WO | WO2018084449 | * | 5/2018 |
| WO | WO 2018/162851 A1 | | 9/2018 |

OTHER PUBLICATIONS

Chen et al., "Synthesis and Characterization of Poly(acrylonitrile)/Montmorillonite Nanocomposites from Surface-Initiated Redox Polymerization", Journal of Applied Polymer Science, vol. 115, 2010, pp. 416-423.

Extended European Search Report for European Application No. 20834698.1, dated Jun. 9, 2022.

Shudo et al. "Development of an All Solid State Battery Incorporating Graphene Oxide as Proton Conductor", Global Challenges, vol. 1, 2017, pp. 1700054 (1-5).

Hernández et al., "Polyimide-polyether binders-diminishing the carbon content in lithium-sulfur batteries", Materials Today Energy 6 (2017), pp. 264-270.

International Search Report for PCT/KR2020/008671 (PCT/ISA/210) mailed on Oct. 8, 2020.

* cited by examiner

[Figure 1]
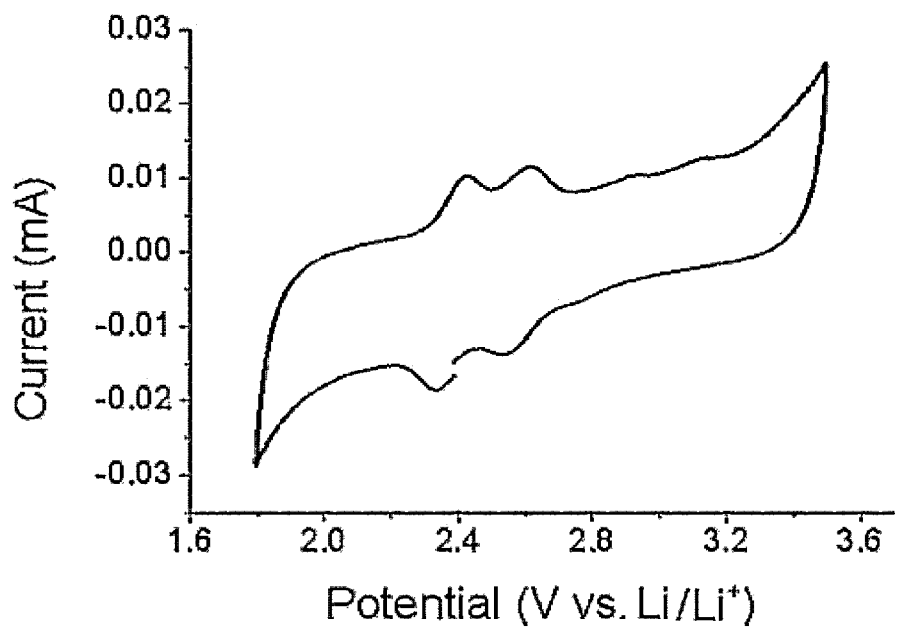
[Figure 2]
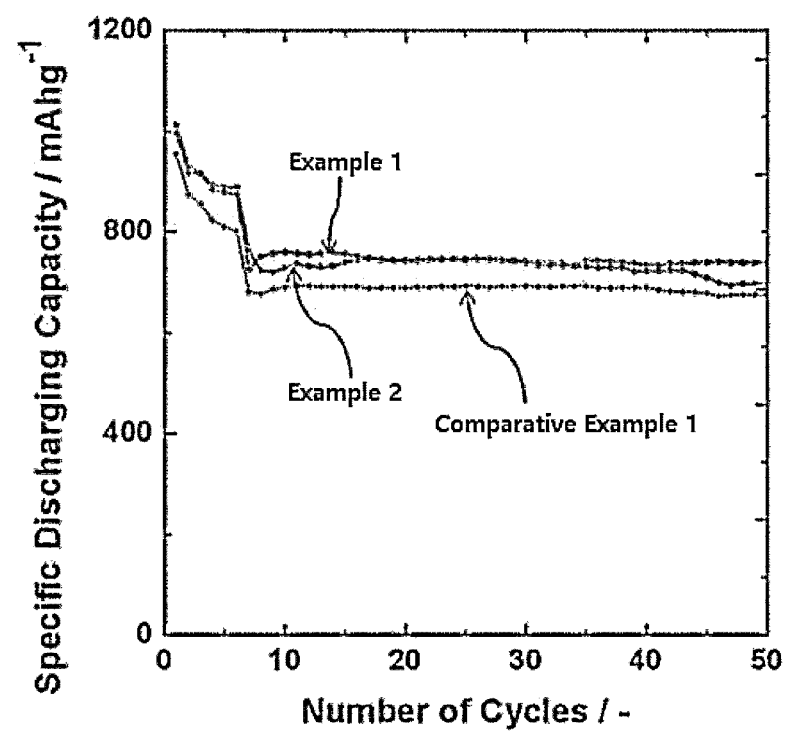

[Figure 3]
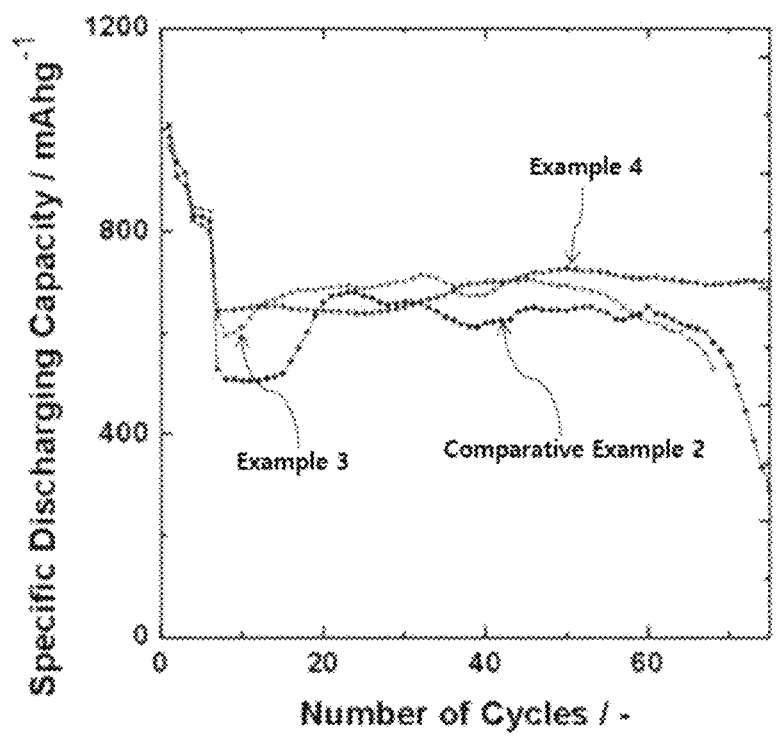
[Figure 4]
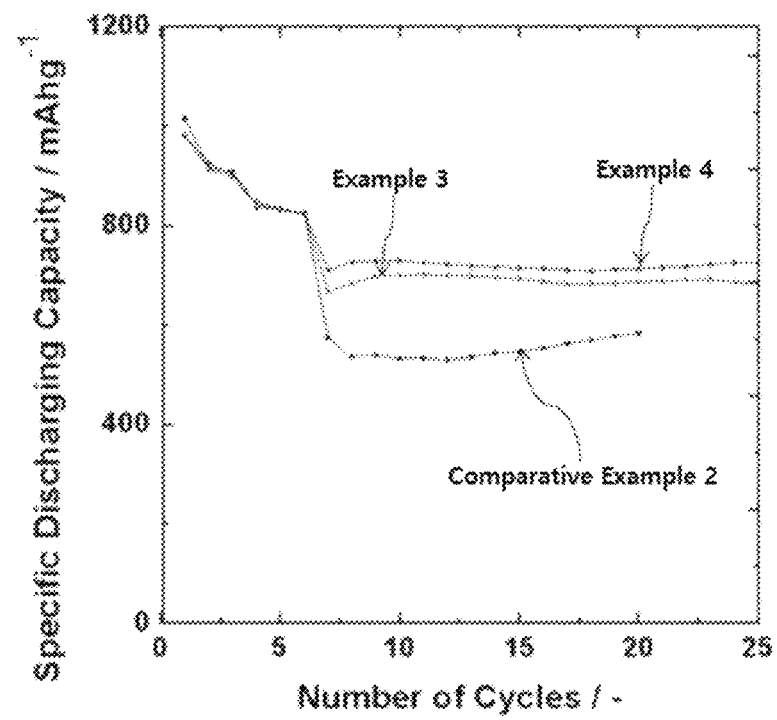

[Figure 5]
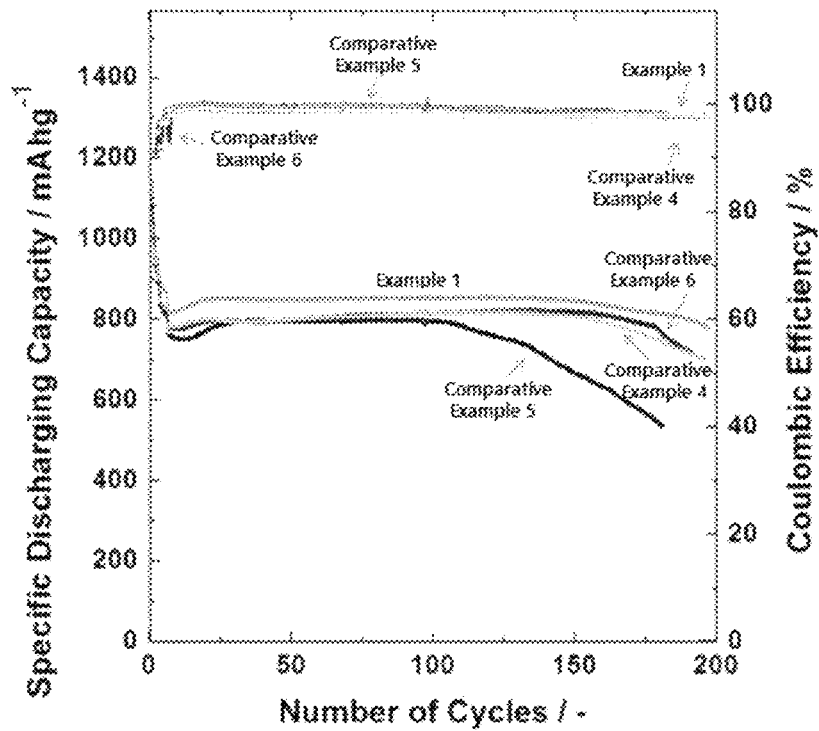
[Figure 6]
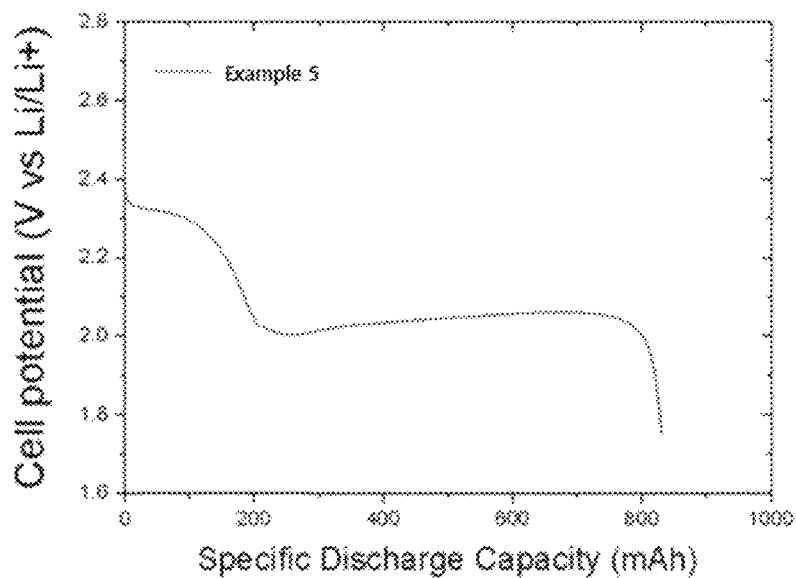

[Figure 7]
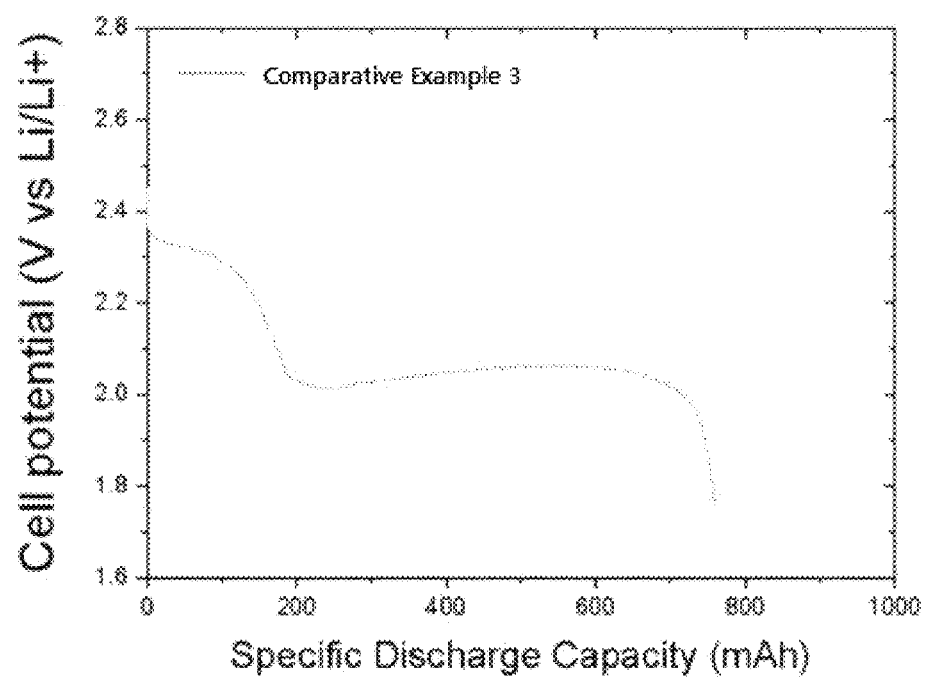

[Figure 8]
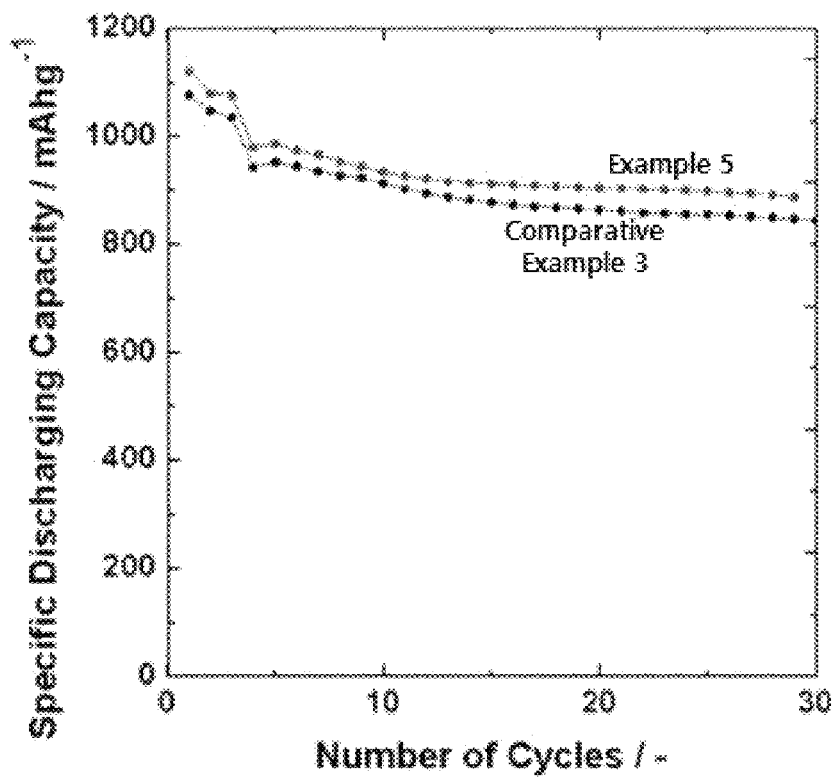
[Figure 9]
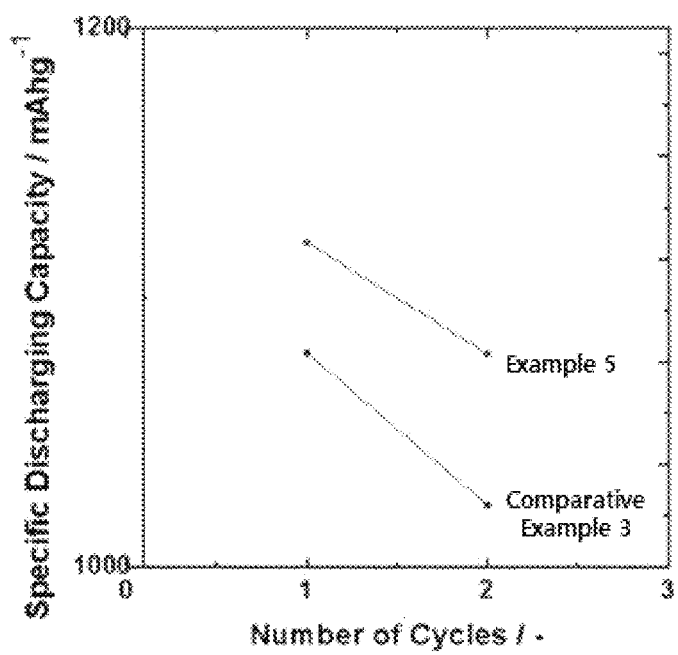

[Figure 10]
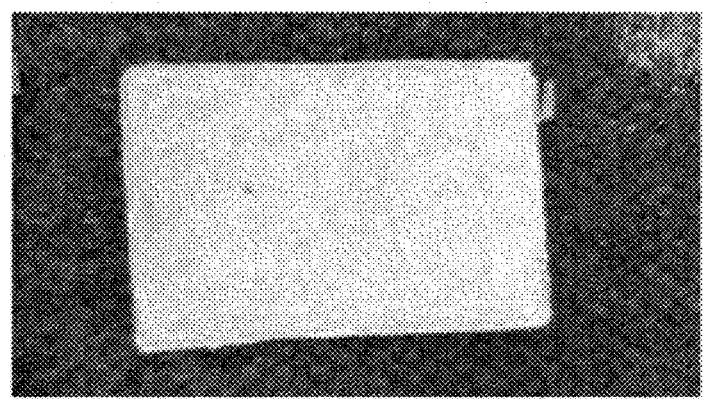
[Figure 11]
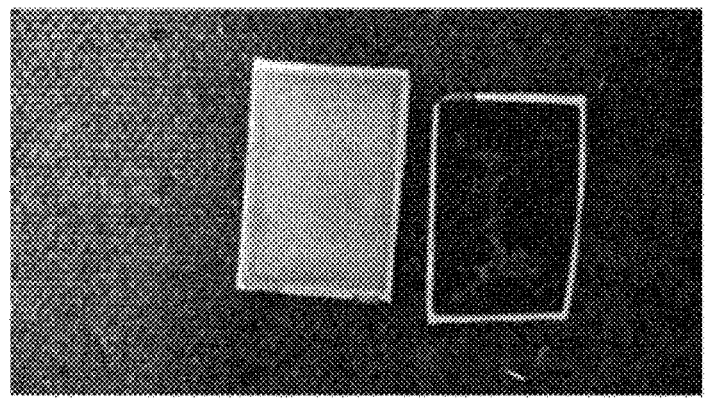

SULFUR-CARBON COMPOSITE, POSITIVE ELECTRODE FOR LITHIUM SECONDARY BATTERY INCLUDING SAME, AND LITHIUM SECONDARY BATTERY

TECHNICAL FIELD

The present application claims the benefit of priorities based on Korean Patent Application No. 10-2019-0079364 filed on Jul. 2, 2019, and Korean Patent Application No. 10-2020-0081369 filed on Jul. 2, 2020, all the contents of which are incorporated herein by reference.

One aspect of the present disclosure relates to a sulfur-carbon composite, a positive electrode for a lithium secondary battery and a lithium secondary battery comprising the same.

BACKGROUND ART

As interest in energy storage technology continues to increase, since its application is expanding from energy for mobile phones, tablets, laptops, and camcorders to even energy for electric vehicles (EVs) and hybrid electric vehicles (HEVs), research and development of electrochemical devices are gradually increasing. The field of electrochemical devices is an area that is receiving the most attention in this respect. Among them, the development of secondary batteries such as a lithium-sulfur secondary battery capable of being charged/discharged has become a focus of attention. In recent years, in developing these batteries, in order to improve capacity density and specific energy, it has led to research and development in designs for new electrodes and batteries.

Among these electrochemical devices, a lithium-sulfur battery (Li—S battery) has a high energy density (theoretical capacity) and thus is in the spotlight as a next-generation secondary battery that can replace a lithium-ion battery. In such a lithium-sulfur battery, a reduction reaction of sulfur and an oxidation reaction of lithium metal occur during discharge. At this time, sulfur forms lithium polysulfide (LiPS) having a linear structure from $S_8$ having a ring structure. This lithium-sulfur battery is characterized by showing a stepwise discharging voltage until the polysulfide is completely reduced to $Li_2S$.

However, the biggest obstacle of the lithium-sulfur battery in the commercialization is the leaching and shuttle phenomenon of the lithium polysulfide, which causes a big problem that the capacity of the lithium-sulfur battery is reduced. That is, since polysulfide leached from the positive electrode has high solubility in the organic electrolyte solution, undesired polysulfide migration (PS shuttling) to the negative electrode through the electrolyte solution may occur. As a result, a decrease in capacity due to irreversible loss of the positive electrode active material and a decrease in the lifetime of the battery by deposition of sulfur particles on the surface of the lithium metal due to side reactions are occurred.

Accordingly, Korean Laid-open Patent Publication No. 2018-0048309 discloses that by applying a sulfur-carbon composite comprising a carbon-nanotube coated with an ion conductive polymer on its surface and sulfur to a lithium-sulfur battery, problems related to leaching and shuttle phenomenon of the polysulfide can be solved.

As such, a technique to prevent the leaching of lithium polysulfide by wrapping the outside of the sulfur-carbon composite used as a positive electrode material for lithium-sulfur batteries, treating the surface of the separator, or using a protective film of a negative electrode has been developed, but its effect is insufficient.

Therefore, in another aspect, in addition to simply trying to solve the problem of leaching of the lithium polysulfide by using a physical membrane, there is a need to develop a technology that can solve the problem of leaching and shuttle of lithium polysulfide.

PRIOR ART DOCUMENT (Patent Document 1) Korean Laid-open Patent Publication No. 10-2018-0048309

DISCLOSURE

Technical Problem

The inventors of one aspect of the present disclosure have conducted various studies to solve the above problems, and as a result, have confirmed that when a sulfur-carbon composite, which is prepared by using a porous carbon material with a surface coated with a copolymer containing a redox functional group capable of performing a catalytic function that promotes the reduction reaction of the lithium polysulfide and a lithium ion conducting functional group capable of improving the delivery of lithium ions, is used as a positive electrode active material for a lithium secondary battery, overvoltage of the lithium secondary battery is reduced, and reactivity and lifetime characteristics are improved.

Therefore, it is one aspect of the present disclosure to provide a sulfur-carbon composite capable of reducing overvoltage and improving reactivity and lifetime characteristics of a lithium secondary battery.

In addition, it is another aspect of the present disclosure to provide a positive electrode for a lithium secondary battery comprising the sulfur-carbon composite and a lithium secondary battery comprising the same.

Technical Solution

In order to achieve the above objects, one aspect of the present disclosure provides a sulfur-carbon composite comprising a porous carbon material; and sulfur formed on at least a portion of the interior and surface of the porous carbon material, wherein the surface of the porous carbon material is coated with a copolymer containing a redox functional group and a lithium ion conducting functional group.

In addition, another aspect of the present disclosure provides a method for preparing a sulfur-carbon composite comprising the steps of (a) coating a porous carbon material with a copolymer containing a redox functional group and a lithium ion conducting functional group; and mixing and molding the porous carbon material coated with the copolymer containing the redox functional group and lithium ion conducting functional group prepared in step (a) and sulfur.

In addition, another aspect of the present disclosure provides a positive electrode for a lithium secondary battery comprising the sulfur-carbon composite of one aspect of the present disclosure.

In addition, another aspect of the present disclosure provides a lithium secondary battery comprising a positive electrode, a negative electrode, a separator interposed between the positive electrode and the negative electrode, and an electrolyte, wherein the positive electrode is the positive electrode of the present invention.

Advantageous Effects

The sulfur-carbon composite of one aspect of the present disclosure has an effect of promoting the reduction of lithium polysulfide and facilitating the delivery of lithium ions.

Accordingly, in the case of the lithium secondary battery containing the sulfur-carbon composite as a positive electrode active material, a reduction reaction of lithium polysulfide occurs quickly, and lithium polysulfide can be prevented from moving out of the positive electrode, thereby improving reactivity and lifetime characteristics, and reducing occurrence of overvoltage.

DESCRIPTION OF DRAWINGS

FIG. 1 is a graph showing the results of cyclic voltammetry for the positive electrode for the lithium-sulfur battery prepared in Example 1.

FIG. 2 is a graph of lifetime characteristics of the lithium-sulfur batteries of Example 1, Example 2, and Comparative Example 1.

FIG. 3 is a graph of lifetime characteristics of the lithium-sulfur batteries of Example 3, Example 4, and Comparative Example 2.

FIG. 4 is a graph of lifetime characteristics in a section in which charging/discharging potential values of the lithium-sulfur batteries of Example 3, Example 4, and Comparative Example 2 are 1.8 to 2.8V.

FIG. 5 is a graph of lifetime characteristics of the lithium-sulfur batteries of Example 1 and Comparative Examples 4 to 6.

FIG. 6 is a graph measuring the initial discharging capacity of the lithium-sulfur battery of Example 5.

FIG. 7 is a graph measuring the initial discharging capacity of the lithium-sulfur battery of Comparative Example 3.

FIG. 8 is a graph of lifetime characteristics of the lithium-sulfur batteries of Example 5 and Comparative Example 3.

FIG. 9 is a graph showing a reduction rate of discharging capacity obtained by measuring the first and second discharging capacities of the lithium-sulfur batteries of Example 5 and Comparative Example 3.

FIG. 10 is a photograph of the surface after evaluation of lifetime characteristics of the negative electrode of the lithium-sulfur battery of Example 5.

FIG. 11 is a photograph of the surface after evaluation of lifetime characteristics of the separator and the positive electrode of the lithium-sulfur battery of Example 5.

BEST MODE

Hereinafter, the present invention will be described in more detail.

The term "composite" as used herein refers to a material that two or more materials are combined to express a more effective function while forming phases physically and chemically different from each other.

In the case of lithium-sulfur battery, among various secondary batteries, it has high discharging capacity and theoretical energy density, and sulfur, used as a positive electrode active material, is rich in reserves and is inexpensive and environmentally friendly, and thus the lithium-sulfur battery is in the spotlight as a next generation battery.

However, in a lithium-sulfur battery, sulfur is converted from a cyclic $S_8$ into linear structures of lithium polysulfides ($Li_2S_x$, x=8, 6, 4, 2) by reduction reaction, and when the lithium polysulfides are completely reduced, lithium sulfide ($Li_2S$) is finally formed. Among lithium polysulfides, which are intermediate products from this reduction reaction of sulfur, lithium polysulfides ($Li_2S_x$, usually x>4) having a high sulfur oxidation number are a highly polar substance, and is easily dissolved in an electrolyte solution containing a hydrophilic organic solvent, thereby being leached out of the reaction region of the positive electrode and can no longer participate in the electrochemical reaction.

The lithium polysulfide leached out of the positive electrode can move to the negative electrode and form a side reaction directly on the surface of the lithium negative electrode, thereby causing a shuttle phenomenon that reduces the capacity of the battery and shortens the lifetime.

Therefore, one aspect of the present disclosure invention was to provide a sulfur-carbon composite that can solve the above problems.

Sulfur-Carbon Composite

One aspect of the present disclosure relates to a sulfur-carbon composite comprising a porous carbon material and sulfur formed on at least a portion of the interior and surface of the porous carbon material, wherein the surface of the porous carbon material is coated with a copolymer containing a redox functional group and a lithium ion conducting functional group.

The surface of the porous carbon material is coated with a copolymer containing a redox functional group and a lithium ion conducting functional group. The coating is coated on the inner and outer surfaces of the porous carbon material, and can be seen as coating the entire surface of the porous carbon material.

The copolymer may be a copolymer of a monomer containing a redox functional group and a monomer containing a lithium ion conducting functional group.

The redox functional group of the monomer containing the redox functional group serves to promote the reduction of lithium polysulfide leached from the positive electrode through redox action. In general, the redox material has a property of a non-conductor that does not pass electrons, but has a redox property when electrons are given or received from the porous carbon material. Accordingly, when the surface of the porous carbon material is coated with the copolymer, redox characteristics may be exhibited without generating overvoltage. Therefore, when the sulfur-carbon composite of one aspect of the present disclosure is applied as a positive electrode active material for a lithium secondary battery, the redox functional group acts to increase the kinetic and may rapidly reduce lithium polysulfide, thereby increasing reactivity, and the phenomenon that the lithium polysulfide is eluted out of the positive electrode may be prevented.

The monomer containing the redox functional group may comprise at least one selected from the group consisting of naphthalene imide-based compounds, perylene-based compounds, and imide-based compounds, preferably naphthalene imide-based compounds.

The lithium ion conducting functional group of the monomer including the lithium ion conducting functional group plays a role of securing the movement path of lithium ions to the inside of the sulfur-carbon composite, that is, the inside of the pores of the porous carbon material. Specifically, if the sulfur-carbon composite of one aspect of the present disclosure is applied as a positive electrode active material of a lithium secondary battery, the reactivity with sulfur, which is a positive electrode active material, increases, along with high ion conductivity, so that the reactivity of the lithium secondary battery may be improved and overvoltage may be reduced.

The monomer containing the lithium ion conducting functional group may comprise at least one selected from the group consisting of ether-based compounds, sulfonic acid-based compounds, carboxylic acid-based compounds, and acrylic acid-based compounds, preferably ether-based compounds.

The copolymer containing the redox functional group and the lithium ion conducting functional group is preferably a naphthalene diimide-polyethylene oxide copolymer, but is not limited thereto.

In the copolymer, the molar ratio of the monomer containing the redox functional group and the monomer containing the lithium ion conducting functional group may be 2:8 to 8:2, specifically 2:8 or more, 3:7 or more, or 4:6 or more, and 6:4 or less, 7:3 or less, or 8:2 or less. If the molar ratio of the monomer containing the redox functional group is less than the above range, overvoltage occurs. If the molar ratio exceeds the above range, redox activity may be lowered.

The number average molecular weight (Mn) of the copolymer may be 500 to 200,000, specifically, 500 or more, 1,000 or more, or 1,500 or more, and 100,000 or less, 150,000 or less, or 200,000 or less.

In addition, the copolymer may be comprised in an amount of 0.25 to 5% by weight, specifically, may be comprised in an amount of 0.25% by weight or more, 0.3% by weight or more, or 0.5% by weight or more, and may be comprised in an amount of 1% by weight or less, 3% by weight or less, or 5% by weight or less, relative to the total weight of the porous carbon material.

If the copolymer is contained in an amount of less than 0.25% by weight, the performance of the redox functional group is deteriorated, and thus the reduction of lithium polysulfide may not be promoted. If the copolymer exceeds 5% by weight, overvoltage may occur and reactivity may decrease.

In addition, as the surface of the porous carbon material is coated with the copolymer, it may also serve as a protective film according to the decomposition of the electrolyte solution.

The porous carbon material provides a framework capable of uniformly and stably immobilizing sulfur, which is a positive electrode active material, and supplements the electrical conductivity of sulfur to enable the electrochemical reaction to proceed smoothly.

The porous carbon material may be generally produced by carbonizing precursors of various carbon materials. The porous carbon material may comprise uneven pores therein, the average diameter of the pores is in the range of 1 to 200 nm, and the porosity may be in the range of 10 to 90% of the total volume of the porosity. If the average diameter of the pores is less than the above range, the pore size is only at the molecular level and impregnation with sulfur is impossible. On the contrary, if the average diameter of the pores exceeds the above range, the mechanical strength of the porous carbon material is weakened, which is not preferable for application to the manufacturing process of the electrode.

The shape of the porous carbon material is in the form of sphere, rod, needle, plate, tube, or bulk, and may be used without limitation as long as it is commonly used in a lithium-sulfur battery.

The porous carbon material may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT), and multiwall carbon nanotubes (MWCNT); carbon fibers such as graphite nanofiber (GNF), carbon nanofiber (CNF), and activated carbon fiber (ACF); and natural graphite, artificial graphite, expanded graphite, and activated carbon. Preferably, the porous carbon material may be carbon nanotubes.

The sulfur may comprise at least one selected from the group consisting of sulfur ($S_8$), $Li_2S_N$ (n≥1), organic sulfur compounds and carbon-sulfur polymers (($C_2S_x$)$_n$, x=2.5 to 50, n≥2].

In addition, the diameter of the sulfur-carbon composite may be 5 to 100 μm, specifically, 5 μm or more, 10 μm or more, or 15 μm or more, and 60 μm or less, 70 μm or less, or 100 μm or less. At this time, the diameter of the sulfur-carbon composite refers to the length of the longest axis in the cross section of the particle. If the diameter of the sulfur-carbon composite is less than 5 μm, the porosity of the positive electrode containing it is decreased, and the reactivity of the positive electrode is lowered. If the diameter of the sulfur-carbon composite exceeds 100 μm, a short circuit occurs due to the non-uniformity of the positive electrode containing it, and problems such as an increase in porosity may occur. In addition, since the electrolyte solution needs to enter the inner end of the sulfur-carbon composite and thus and then react to, output characteristics may be poor.

Also, on the basis of the total weight of the sulfur-carbon composite, the porous carbon material coated with a copolymer containing the redox functional group and lithium ion conducting functional group on the surface may be included in an amount of 10 to 50% by weight, and sulfur may be included in an amount of 50 to 90% by weight.

Preparation Method of Sulfur-Carbon Composite

In addition, another aspect of the present disclosure relates to a method for preparing a sulfur-carbon composite comprising the steps of, (a) coating a porous carbon material with a copolymer containing a redox functional group and a lithium ion conducting functional group; and (b) mixing and molding the porous carbon material coated with the copolymer prepared in step (a) and sulfur.

Step (a) is a step of coating a porous carbon material with a copolymer containing a redox functional group and a lithium ion conducting functional group.

The copolymer and porous carbon material are the same as described above.

The coating is not particularly limited as long as it is a coating method used to form a coating layer in the art, and may be formed by a wet coating method, a drop-cast method, a dip-coating method, a blade coating method, a spray coating method, a Meyer bar coating method or a vacuum filtration method.

In the coating, if a solvent is required, water, or organic solvents such as ethanol, acetone, isopropyl alcohol (IPA), tetrahydrofuran (THF), methylene chloride (MC), dimethylformamide (DMF), dimethyl sulfoxide (DMSO) and Dimethylacetamide (DMAc) may be used. Among them, it may be preferable to apply THF or a compound having similar properties as a solvent.

In addition, when coating the surface of the porous carbon material with the copolymer containing the redox functional group and the lithium ion conducting functional group, the bonding at the interface between the porous carbon material and the coating layer containing the copolymer is achieved by the reaction between the copolymer and carbon (bonding by n-n interaction). At this time, the reaction may be performed at 15° C. to 100° C. for 1 to 24 hours, specifically, the reaction temperature may be 15° C. or higher, 20° C. or higher, 30° C. or higher, or 40° C. or higher, and 70° C. or lower, 80° C. or lower, 90° C. or lower or 100° C. or lower. Through the reaction described above, the electrons may be transferred to the redox functional group and the lithium ion conducting functional group to reduce the lithium polysulfide and secure a movement path of lithium ions.

Step (b) is a step of preparing a sulfur-carbon composite by mixing and molding the porous carbon material coated with the copolymer containing the redox functional group and the lithium ion conducting functional group prepared in step (a) above and sulfur.

The process of mixing and molding the sulfur may be any method as long as it is a method known in the art.

The mixing is to increase the mixing degree between the aforementioned materials and may be performed using a stirring device commonly used in the art. At this time, the mixing time and speed may also be selectively adjusted depending on the content and conditions of the raw materials.

The heating temperature may be any temperature at which sulfur is melted, and specifically, may be 120° C. or higher, 130° C. or higher, 140° C. or higher, or 150° C. or higher, and may be 160° C. or lower, 170° C. or lower, or 180° C. or lower. If the heating temperature is less than 120° C., sulfur is not sufficiently melted, so that a structure of sulfur-carbon composite may not be properly formed. If the heating temperature exceeds 180° C., it is difficult to obtain the desired effect because the coated compound does not remain.

Through the step (b) above, the sulfur-carbon composite may be prepared, and the porous carbon material is coated with a copolymer containing a redox functional group and a lithium ion conducting functional group on the surface.

Positive Electrode for Lithium Secondary Battery

In addition, another aspect of the present disclosure relates to a positive electrode for a lithium secondary battery comprising the sulfur-carbon composite of one aspect of the present disclosure.

Specifically, another aspect of the present disclosure relates to a positive electrode for a lithium secondary battery comprising a positive electrode current collector and a positive electrode active material layer formed on the positive electrode current collector, wherein the positive electrode active material layer comprises the above-described sulfur-carbon composite of one aspect of the present disclosure, an electrically conductive material, and a binder.

The sulfur-carbon composite is a positive electrode active material, and accordingly, the positive electrode of another aspect of the present disclosure may be a positive electrode for a lithium-sulfur battery.

The electrically conductive material may be comprised, together with the positive electrode active material, for the purpose of smoothly moving electrons within the positive electrode, and the binder may be included for the purpose of increasing the bonding force between the positive electrode active materials or between the positive electrode active material and the current collector.

The positive electrode current collector generally may be made in a thickness of 3 to 500 µm and is not particularly limited as long as it has high electrical conductivity without causing chemical changes in the battery. For example, an electrically conductive metal such as stainless steel, aluminum, copper, or titanium, etc., may be used as the positive electrode current collector, and preferably an aluminum current collector may be used. The positive electrode current collector may be formed in various forms such as film, sheet, foil, net, porous body, foam, or nonwoven fabric.

The electrically conductive material may be carbon-based materials such as carbon black, acetylene black, and Ketjen black; or a conductive polymer such as polyaniline, polythiophene, polyacetylene, polypyrrole, and may be preferably comprised in an amount of 5 to 20 wt. % based on the total weight of the positive electrode active material layer. If the content of the electrically conductive material is less than 5 wt. %, the effect of improving the electrical conductivity by the use of the electrically conductive material is insignificant. On the other hand, if the content of the electrically conductive material exceeds wt. %, the content of the positive electrode active material becomes relatively small, and thus there is a possibility that the capacity characteristics may be deteriorated.

In addition, the binder may be poly(vinyl acetate), polyvinylalcohol, polyethyleneoxide, polyvinylpyrrolidone, alkylated polyethyleneoxide, cross-linked polyethyleneoxide, polyvinylether, poly(methylmethacrylate), polyvinylidene fluoride, copolymer of polyhexafluoropropylene and polyvinylidene fluoride (product name: Kynar), poly (ethylacrylate), polytetrafluoroethylene, polyvinylchloride, polyacrylonitrile, polyvinylpyridine, polystyrene, ethylene-co-vinyl acetate, cellulose acetate, cellulose acetate propionate, cellulose acetate butyrate, pullulan, cyanoethylpullulan, cyanoethylpolyvinyl alcohol, cyanoethylcellulose, cyanoethyl sucrose, carboxymethyl cellulose, styrene butadiene rubber, acrylonitrile-styrene-butadiene copolymer, polyimide, and derivatives, blends and copolymers thereof or the like. Also, the binder may be preferably comprised in an amount of 5 to 20 wt. % based on the total weight of the positive electrode active material layer. If the content of the binder is less than 5 wt. %, the effect of improving the bonding force between the positive electrode active materials or between the positive electrode active material and the current collector depending on the use of the binder is insufficient. On the other hand, if the content of the binder exceeds 20 wt. %, the content of the positive electrode active material becomes relatively small, and thus there is a possibility that the capacity characteristics may be deteriorated.

The positive electrode as described above may be prepared by a conventional method, and specifically, may be prepared by applying the composition for forming the positive electrode active material layer in the state of slurry prepared by mixing the positive electrode active material, the electrically conductive material, and the binder in an organic solvent, on a current collector, followed by drying and optionally rolling them.

At this time, the organic solvent may be a solvent which may uniformly disperse the positive electrode active material, the binder, and the electrically conductive material, and which is easily evaporated. Specifically, the organic solvent may comprise acetonitrile, methanol, ethanol, tetrahydrofuran, isopropyl alcohol and the like.

The loading amount of the positive electrode active material may be 3 mg/cm$^2$ or more, or 5 mg/cm$^2$ or more, and 6 mg/cm$^2$ or less, or 8 mg/cm$^2$ or less, but is not limited thereto.

The lithium secondary battery including the positive electrode may exhibit excellent reactivity and lifetime characteristics even at the above loading amount, that is, low loading and high loading. This is because the copolymer containing the redox functional group and the lithium ion conducting functional group described above was coated on the surface of the porous carbon material of the sulfur-carbon composite.

Lithium Secondary Battery

Another aspect of the present disclosure relates to a lithium secondary battery comprising a positive electrode; a negative electrode; a separator interposed between the positive electrode and the negative electrode; and an electrolyte solution, wherein the positive electrode is the positive electrode of another aspect of the present disclosure described above.

The lithium secondary battery may be preferably a lithium-sulfur battery.

The negative electrode may be composed of a current collector and a negative electrode active material layer formed on one or both surfaces thereof. In addition, the negative electrode may be a lithium metal plate.

The current collector is for supporting the negative electrode active material and is not particularly limited as long as it is electrochemically stable in the voltage range of the lithium secondary battery while having excellent conductivity, and for example, copper, stainless steel, aluminum, nickel, titanium, palladium, sintered carbon, or copper or stainless steel whose surface is treated with carbon, nickel, silver or the like, or aluminum-cadmium alloy or the like may be used.

The negative electrode current collector may enhance the bonding force with the negative electrode active material by having fine irregularities on its surface, and may be formed in various forms such as film, sheet, foil, mesh, net, porous body, foam, or nonwoven fabric.

The negative electrode active material may comprise a material capable of reversibly intercalating or deintercalating lithium ion, a material capable of reacting with lithium ion to reversibly form lithium containing compounds, or lithium metal or lithium alloy.

The material capable of reversibly intercalating or deintercalating lithium ion may be, for example, crystalline carbon, amorphous carbon, or a mixture thereof.

The material capable of reacting with lithium ion to reversibly form lithium containing compounds may be, for example, tin oxide, titanium nitrate, or silicon.

The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

A separator is additionally comprised between the positive electrode and the negative electrode. The separator enables the transport of lithium ions between the positive electrode and the negative electrode while separating or insulating the positive electrode and the negative electrode from each other. The separator may be made of a porous, nonconductive or insulating material. The separator may be an independent member such as a film or a coating layer added to the positive electrode and/or the negative electrode.

The material constituting the separator comprises, for example, but is not limited to, polyolefins such as polyethylene and polypropylene, glass fiber filter paper, and ceramic materials, and the thickness thereof may be 5 μm or more or 10 μm or more, or 25 μm or less or 50 μm or less.

The electrolyte solution is a non-aqueous electrolyte containing lithium salts and is composed of a lithium salt and an electrolyte solution. As the electrolyte solution, non-aqueous organic solvents, organic solid electrolytes, and inorganic solid electrolytes may be used.

As the lithium salt, lithium salts conventionally used in an electrolyte solution for a lithium secondary battery, preferably a lithium-sulfur battery may be used without limitation. The lithium salt may comprise, for example, at least one selected from the group consisting of LiSCN, LiBr, LiI, $LiPF_6$, $LiBF_4$, $LiB_nCl_{10}$, $LiSO_3CF_3$, LiCl, $LiClO_4$, $LiSO_3CH_3$, $LiB(Ph)_4$, $LiC(SO_2CF_3)_3$, $LiN(SO_2CF_3)_2$, $LiCF_3CO_2$, $LiAsF_6$, $LiSbF_6$, $LiAlCl_4$, LiFSI, lithium chloroborane, lithium lower aliphatic carboxylate and the like.

In addition, the concentration of the lithium salt in the electrolyte solution may be 0.2 to 2 M, specifically 0.2 M or more, 0.6 M or more, or 0.7 M or more, and 1.5 M or less, 1.7 M or less, or 2 M or less. If the concentration of the lithium salt is less than 0.2 M, the conductivity of the electrolyte solution may be lowered and thus the performance of the electrolyte solution may be deteriorated. If the concentration of the lithium salt exceeds 2 M, the viscosity of the electrolyte solution may increase and thus the mobility of the lithium ion may be reduced.

The non-aqueous organic solvent should dissolve the lithium salt well, and the non-aqueous organic solvent of another aspect of the present disclosure may comprise, for example, aprotic organic solvents such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydrofuran, 2-methyl tetrahydrofuran, dimethylsulfoxide, 1,3-dioxolane, 4-methyl-1,3-dioxane, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents may be used alone or as a mixture of two or more solvents thereof.

As the organic solid electrolyte, for example, polyethylene derivatives, polyethylene oxide derivatives, polypropylene oxide derivatives, phosphate ester polymers, poly agitation lysine, polyester sulfide, polyvinyl alcohol, polyvinylidene fluoride, and polymers comprising ionic dissociation groups and the like may be used.

As the inorganic solid electrolyte, for example, nitrides, halides, sulfates and the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$ may be used.

The electrolyte of another aspect of the present disclosure, for example, pyridine, triethylphosphite, triethanolamine, cyclic ether, ethylene diamine, n-glyme, hexamethyl phosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, or aluminum trichloride, etc. may also be added for the purpose of improving charging/discharging characteristics, flame retardancy and the like. In some cases, a halogen-containing solvent such as carbon tetrachloride, ethylene trifluoride or the like may be also added for the purpose of imparting nonflammability, and carbon dioxide gas may be further comprised for the purpose of improving storage characteristics at a high temperature, and fluoro-ethylene carbonate (FEC), propene sultone (PRS), fluoro-propylene carbonate (FPC) and the like may be further comprised.

As an electrolyte, a liquid electrolyte may be used or also an electrolyte separator form in a solid state may be used. When using a liquid electrolyte, a separator made of porous glass, plastic, ceramic, or polymer is further comprised as a physical separator having a function of physically separating the electrodes.

The lithium secondary battery of another aspect of the present disclosure, preferably lithium-sulfur battery, comprises the sulfur-carbon composite of one aspect of the present disclosure as a positive electrode active material. As the surface of the porous carbon material of the sulfur-carbon composite is coated with a copolymer containing a redox functional group and a lithium ion conducting functional group, the redox functional group acts to increase the kinetic, thereby rapidly reducing the lithium polysulfide to increase reactivity, The lithium polysulfide may be prevented from leaching out of the positive electrode, thereby improving the reactivity and lifetime characteristics of the battery, and the lithium ion conducting functional group may secure the movement path of lithium ions to increase reactivity and reduce overvoltage.

Hereinafter, in order to facilitate understanding of the present invention, preferred examples are presented, but the following examples are intended to illustrate the present invention only. It will be apparent to those skilled in the art that various changes and modifications can be made within the scope and spirit of the present invention, and also it is obvious that such changes and modifications fall within the scope of the appended claims.

Preparation of Lithium-Sulfur Battery

Example 1

Naphthalene diimide-Polyethylene oxide (Nap-PEO) was prepared by copolymerizing polyether amine (product name: Jeffamine™) and naphthalene anhydride in a molar ratio of 1:1.

A solution was prepared by dissolving the naphthalene diimide-polyethylene oxide (Nap-PEO) in an amount of 1% by weight relative to the total weight of carbon nanotubes in a solvent of methylene chloride. After adding 0.6 g of carbon nanotubes to the solution, the mixture was stirred at 25° C. and dried for 12 hours to coat the surface of the carbon nanotubes with Nap-PEO. At this time, the weight of the Nap-PEO means the weight of Nap-PEO relative to the total weight of the carbon nanotubes coated with Nap-PEO.

0.6 g of carbon nanotubes coated with Nap-PEO prepared above and 1.4 g of sulfur were evenly mixed, followed by heat treatment at 155° C. for 30 minutes to produce a sulfur-carbon composite containing sulfur:Nap-PEO coated carbon nanotubes in a weight ratio of 70:30.

The sulfur-carbon composite, an electrically conductive material and a binder were mixed with deionized water (DIW) in a weight ratio of 90:5:5 of the sulfur-carbon composite:the electrically conductive material:the binder to prepare a slurry, and then coated on a current collector of aluminum foil having a thickness of 20 μm to prepare an electrode. Based on the total weight of the deionized water, the weight of sulfur-carbon composite was set to 20% by weight. In addition, carbon black was used as the electrically conductive material, and styrene-butadiene rubber and carboxymethyl cellulose were used as the binder. Subsequently, a positive electrode was prepared by drying in an oven at 50° C. overnight. At this time, the loading amount of the positive electrode active material was 4 mg/cm² (low loading).

A coin cell was prepared using polyethylene as a separator and lithium foil having a thickness of 45 μm as a negative electrode. At this time, the coin cell was prepared as a lithium-sulfur battery, a coin cell, using an electrolyte prepared by dissolving 1 M LiTFSI and 3 wt. % LiNO₃ in an organic solvent composed of a DOL/DME solvent (1:1 volume ratio).

Example 2

A solution was prepared by dissolving naphthalene diimide-polyethylene oxide (Nap-PEO) in an amount of 2% by weight relative to the total weight of carbon nanotubes, in a solvent of methylene chloride. After adding 0.6 g of carbon nanotubes to the solution, the mixture was stirred at 25° C. and dried for 12 hours to form a Nap-PEO coating layer on the surface of the carbon nanotube.

The subsequent process was performed in the same manner as in Example 1 to manufacture a lithium-sulfur battery, a coin cell.

At this time, the loading amount of the positive electrode active material was 4 mg/cm² (low loading).

Example 3

A lithium-sulfur battery, a coin cell, was manufactured in the same manner as in Example 1, except that the loading amount of the positive electrode active material was 5.5 mg/cm² (high loading).

Example 4

A lithium-sulfur battery, a coin cell, was manufactured in the same manner as in Example 2, except that the loading amount of the positive electrode active material was 5.5 mg/cm² (high loading).

Example 5

A lithium-sulfur battery of a pouch cell was manufactured in the same manner as in Example 1, except that it was manufactured as a pouch cell instead of a coin cell. At this time, the loading amount of the positive electrode active material was 5.5 mg/cm² (high loading).

Comparative Example 1

After uniformly mixing 0.6 g of carbon nanotubes and 1.4 g of sulfur, heat treatment was performed at 155° C. for minutes to prepare sulfur-carbon composite containing sulfur and carbon nanotubes in a weight ratio of 70:30 of sulfur: the carbon nanotubes.

The subsequent process was performed in the same manner as in Example 1 to manufacture a lithium-sulfur battery, a coin cell.

At this time, the loading amount of the positive electrode active material was 4 mg/cm² (low loading).

Comparative Example 2

A lithium-sulfur battery, a coin cell, was manufactured in the same manner as in Comparative Example 1, except that the loading amount of the positive electrode active material was 5.5 mg/cm² (high loading).

Comparative Example 3

A lithium-sulfur battery of a pouch cell was manufactured in the same manner as in Comparative Example 2, except that it was manufactured as a pouch cell instead of a coin cell.

At this time, the loading amount of the positive electrode active material was 5.5 mg/cm² (low loading).

Comparative Example 4

A lithium-sulfur battery, a coin cell, was manufactured in the same manner as in Example 1, except that naphthalene diimide was used instead of naphthalene diimide-polyethylene oxide (Nap-PEO) when forming the coating layer of the carbon nanotube.

Comparative Example 5

A lithium-sulfur battery, a coin cell, was manufactured in the same manner as in Example 1, except that polyethylene oxide was used instead of naphthalene diimide-polyethylene oxide (Nap-PEO) when forming the coating layer of the carbon nanotube.

Comparative Example 6

A lithium-sulfur battery, a coin cell, was manufactured in the same manner as in Example 1, except that naphthalene diimide-polyethylene oxide (Nap-PEO) is not used when forming the coating layer of the carbon nanotube, and the Nap-PEO is added when preparing the slurry of the positive electrode. The amount of Nap-PEO added was 1% by weight relative to the total weight of the carbon nanotubes contained in the sulfur-carbon composite.

Experimental Example 1. Measurement of Cyclic Voltammetry of Positive Electrode for Lithium-Sulfur Battery Cyclic voltammetry was performed to observe the potential zone where reactivity of the Nap-PEO-coated carbon nanotubes prepared in Example 1 appears. The current value measured at the working electrode when the scan rate was changed within 20 to 200 mV/s and a voltage between 1.6 and 3.6V was applied was recorded, and the results are shown in FIG. 1.

From the above results, it was confirmed that Nap-PEO-coated carbon nanotubes exhibited reactivity in the section of 1.8 to 2.8V.

Experimental Example 2. Measurement of Lifetime Characteristics of Lithium-Sulfur Battery (Coin Cell)

The lifetime characteristics of lithium-sulfur batteries of coin cells manufactured in Examples 1 to 4 and Comparative Examples 1 to 2 were evaluated.

0.1C/0.1C charging/discharging was performed during the initial 3 cycles, and then 0.2C/0.2C charging/discharging was performed for 3 cycles, and then charging/discharging was repeated at 0.3C/0.5C using a measuring device to measure the life characteristics.

2-1. Measurement of Lifetime Characteristics of Lithium-Sulfur Batteries Comprising Low Loading Positive Electrodes The lifetime characteristics of the lithium-sulfur batteries manufactured in Examples 1 to 2 and Comparative Example 1 were measured. The positive electrodes of the lithium-sulfur batteries of Example 1, Example 2, and Comparative Example 1 are lithium-sulfur batteries comprising a low loading positive electrode with a loading amount of the positive electrode active material of 4 mg/cm².

In the results of Example 1 to Example 2 and Comparative Example 1 (FIG. 2), the lithium-sulfur batteries of Example 1, Example 2, and Comparative Example 1 maintained discharging capacity even after cycles, thereby showing excellent results in lifetime characteristics.

However, Comparative Example 1 showed lower results in reactivity than Example 1 and Example 2.

2-2. Measurement of Lifetime Characteristics of Lithium-Sulfur Batteries Comprising High Loading Positive Electrodes The lifetime characteristics of the lithium-sulfur batteries manufactured in Examples 3 to 4 and Comparative Example 2 were measured. The positive electrodes of the lithium-sulfur batteries of Example 3, Example 4, and Comparative Example 2 are lithium-sulfur batteries comprising high loading positive electrodes with a loading amount of the positive electrode active material of 5.5 mg/cm².

In the results of Examples 3 to 4 and Comparative Example 2 (FIG. 3), Comparative Example 2 did not maintain discharging capacity as the cycle progressed, showed unstable results, and showed poor results in lifetime characteristics.

Example 3 showed the result that lifetime characteristics deteriorated after 50 cycles, but Example 4 showed excellent results in lifetime characteristics by maintaining discharging capacity even when cycles are progressed.

That is, Comparative Example 2 comprising the sulfur-carbon composite without coating the surface of the porous carbon material had very poor lifetime characteristics at the high-loading electrode, showing unstable results in reactivity, and Examples 3 and 4 comprising the sulfur-carbon composite coated on the surface of the porous carbon material with the copolymer containing the redox functional group and the lithium ion conducting functional group showed excellent results in lifetime characteristics. Particularly, Example 4 comprising the copolymer in an amount of 2% by weight relative to the total weight of the porous carbon material showed superior results in lifetime characteristics than Example 3 containing 1% by weight.

2-3. Measurement of Lifetime Characteristics of Lithium-Sulfur Battery Containing High Loading Positive Electrode The lifetime characteristics of lithium-sulfur batteries manufactured in Examples 3 to 4 and Comparative Example 2 were measured. The positive electrodes of the lithium-sulfur batteries of Example 3, Example 4, and Comparative Example 2 are lithium-sulfur batteries comprising high loading positive electrodes with a loading amount of the positive electrode active material of 5.5 mg/cm². At this time, the lifetime characteristics were measured while setting the charging/discharging potential values to 1.8 to 2.8 V which is a section in which reactivity appeared in the measurement by the cyclic voltammetry.

In the results of Examples 3 to 4 and Comparative Example 2 (FIG. 4), Comparative Example 2 showed poor reactivity results in the section. On the other hand, Example 3 and Example 4 showed excellent results in reactivity and lifetime characteristic.

That is, Comparative Example 2 comprising the sulfur-carbon composite without coating the surface of the porous carbon material showed poor results in reactivity in the section where reactivity appeared, and Examples 3 and 4 comprising the sulfur-carbon composite coated with the copolymer containing the redox functional group and the lithium ion conducting functional group on the surface of the porous carbon material showed excellent results in lifetime characteristics and reactivity.

2-4. Measurement of Lifetime Characteristics of Lithium-Sulfur Battery Depending on the Kind of Coating Material of Porous Carbon Material and the Type of Copolymer Containing Redox Functional Group and Lithium Ion Conducting Functional Group The lifetime characteristics of lithium-sulfur batteries of coin cells manufactured in Example 1 and Comparative Examples 4 to 6 were evaluated.

0.1C/0.1C charging/discharging was performed during the initial 2.5 cycles, and then 0.2C/0.2C charging/discharging was performed for 3 cycles, and then charging/discharging was repeated at 0.3C/0.5C using a measuring device to measure the life characteristics.

(1) Measurement of Lifetime Characteristics Depending on the Kind of Coating Material of Porous Carbon Material In the measurement results of discharging capacity of Example 1 and Comparative Example 4 and Comparative Example 5, Example 1 showed superior results in discharging capacity compared to Comparative Example 4 and Comparative Example 5 (FIG. 5).

That is, Example 1 comprising the redox functional group and the copolymer containing the lithium ion conducting functional group as a coating material of the porous carbon material was found to have a smaller capacity reduction rate than Comparative Example 4 (the porous carbon material is coated with a material containing a redox functional group) and Comparative Example 5 (the porous carbon material is coated with a material containing lithium ion conducting functional group).

(2) Measurement of Lifetime Characteristics Depending on the Inclusion Type of Copolymer Containing Redox Functional Group and Lithium Ion Conducting Functional Group In the measurement results of discharging capacity of Example 1 and Comparative Example 6, Example 1 showed excellent results in discharging capacity compared to Comparative Example 6 (FIG. 5).

That is, it was confirmed that Example 1, in which the copolymer containing the redox functional group and the lithium ion conducting functional group is coated on the surface of the porous carbon material of the sulfur-carbon composite, has a smaller capacity reduction rate than Comparative Example 6, in which the copolymer is included in the positive electrode in a form simply mixed with the sulfur-carbon composite.

Experimental Example 3. Measurement of Charging/Discharging Characteristics of Lithium-Sulfur Battery (Pouch Cell)

The discharging capacity and lifetime characteristics of the lithium-sulfur batteries manufactured in Example 5 and Comparative Example 3 were measured. The positive electrodes of the lithium-sulfur batteries of Example 5 and Comparative Example 3 are lithium-sulfur batteries comprising high loading positive electrodes with a loading amount of the positive electrode active material of 5.5 mg/cm². At this time, the lifetime characteristics were measured while setting the charging/discharging potential values to 1.8 to 2.8 V which is a section in which reactivity appeared in the measurement by the cyclic voltammetry.

0.1C/0.1C charging/discharging was performed during the initial 3 cycles, and then 0.2C/0.2C charging/discharging was performed for 3 cycles, and then charging/discharging was repeated at 0.3C/0.5C using a measuring device to measure the life characteristics.

In the measurement results of initial discharging capacity of Example 5 and Comparative Example 3, Example 5 showed superior results in initial discharging capacity compared to Comparative Example 3 (FIGS. 6 and 7).

In addition, in the results of measuring the lifetime characteristics of Example 5 and Comparative Example 3 (FIG. 8), Comparative Example 3 showed poor results in lifetime characteristics and reactivity compared to Example 5.

That is, Example 5 comprising the sulfur-carbon composite coated with the copolymer containing the redox functional group and the lithium ion conducting functional group on the surface of the porous carbon material showed better results in lifetime characteristics and reactivity than Comparative Example 3 comprising the sulfur-carbon composite without coating the surface of the porous carbon material, and also showed improved overvoltage results On the other hand, the initial first and second discharging capacities of Example 5 and Comparative Example 3 were measured to measure discharging capacity reduction rate (FIG. 9).

In the above results, Example 5 was measured to have a smaller reduction rate of discharging capacity than Comparative Example 3. From this, it was confirmed that in the case of Example 5 comprising the sulfur-carbon composite coated with the copolymer containing the redox functional group and the lithium ion conducting functional group on the surface of the porous carbon material, the capacity reduction rate was smaller than Comparative Example 3 comprising the sulfur-carbon composite without coating the surface of the porous carbon material.

In addition, after evaluating the lifetime characteristics of the lithium-sulfur battery of Example 5, the pouch cell was disassembled to observe the surface of the negative electrode (FIG. 10) and the separator and the positive electrode (left and right of FIG. 11) of Example 5.

The negative electrode of the lithium-sulfur battery of Example 5 was observed to have a clean surface. It can be seen that as the copolymer coated on the porous carbon material of sulfur-carbon composite contained in the positive electrode of the lithium-sulfur battery of Example 5, that is, the redox functional group contained in the copolymer promotes the reduction reaction of the lithium polysulfide and thus prevents lithium polysulfide from moving out of the positive electrode, the surface of the negative electrode shows clean results. Specifically, the meaning of the description that the lithium polysulfide is prevented from moving out of the positive electrode may be that the reduction reaction of the lithium polysulfide is promoted and the lithium polysulfide is rapidly disappeared, so that the possibility of going out of the positive electrode is reduced.

In addition, when separating the positive electrode and the separator of the lithium-sulfur battery in the form of the pouch cell of Example 5, the positive electrode was observed as a dark color. Due to the nature of the pouch cell, since the separator and the positive electrode were stacked and separated in a pressurized state, a part of the surface of the positive electrode was transferred to the separator, and the inside of the positive electrode having a dark color was observed. If the lithium polysulfide formed in the positive electrode remains inside the positive electrode, yellow is observed. However, in the case of the positive electrode above, since the redox functional group contained in the copolymer coated on the porous carbon material of sulfur-carbon composite promoted the reduction reaction of lithium polysulfide and thus the lithium polysulfides were eliminated, the positive electrode appeared as a dark color, not yellow.

Through this, it was confirmed that the lithium-sulfur battery of the present invention comprising a sulfur-carbon composite containing a porous carbon material whose surface is coated with a copolymer containing a redox functional group and a lithium ion conducting functional group, and sulfur, as a positive electrode active material may improve the reactivity and lifetime characteristics of the battery by promoting the reduction reaction of the lithium polysulfide and thus inhibiting the lithium polysulfide from moving out of the positive electrode, and may reduce the overvoltage and improve the reactivity by securing a movement path of lithium ions.

The invention claimed is:

1. A sulfur-carbon composite comprising:
 a porous carbon material;
 a coating present on a surface of the porous carbon material, wherein said coating comprises a copolymer containing a redox functional group and a lithium ion conducting functional group;
 wherein the copolymer is a copolymer of a monomer containing the redox functional group and a monomer containing the lithium ion conducting functional group;
 wherein the monomer containing the redox functional group comprises at least one selected from the group consisting of naphthalene imide-based compounds, perylene-based compounds, and imide-based compounds;
 wherein the monomer containing the lithium ion conducting functional group comprises at least one selected from the group consisting of ether-based compounds, sulfonic acid-based compounds, carboxylic acid-based compounds, and acrylic acid-based compounds;
 sulfur present on at least a portion of an interior or a surface of the porous carbon material;
 wherein a molar ratio of the monomer containing the redox functional group and the monomer containing the lithium ion conducting functional group is 2:8 to 8:2;
 wherein the copolymer is present in an amount of 0.25 to 5% by weight based on a total weight of the porous carbon material; and
 wherein the coated porous carbon material is present in an amount of 10 to 50% by weight and sulfur is present in an amount of 50 to 90% by weight, based on a total weight of the sulfur-carbon composite.

2. The sulfur-carbon composite according to claim 1, wherein the monomer containing the lithium ion conducting functional group comprises at least one selected from the group consisting of sulfonic acid-based compounds, carboxylic acid-based compounds, and acrylic acid-based compounds.

3. The sulfur-carbon composite according to claim 1, wherein the copolymer comprises a naphthalene diimide-polyethylene oxide copolymer.

4. A method for preparing the sulfur-carbon composite according to claim 1, comprising the steps of:
 (a) coating a porous carbon material with a copolymer containing a redox functional group and a lithium ion conducting functional group; and
 (b) mixing and molding the porous carbon material coated with the copolymer containing the redox functional group and the lithium ion conducting functional group prepared in step (a) and sulfur.

5. A positive electrode for a lithium secondary battery comprising the sulfur-carbon composite according to claim 1.

6. The positive electrode for the lithium secondary battery according to claim 5, wherein the positive electrode has a loading amount of positive electrode active material of 3 to 8 $mg/cm^2$.

7. The positive electrode for the lithium secondary battery according to claim 5, wherein the positive electrode for the lithium secondary battery is a positive electrode for a lithium-sulfur battery.

8. A lithium secondary battery comprising a positive electrode; a negative electrode; a separator interposed between the positive electrode and the negative electrode; and an electrolyte, wherein the positive electrode is the positive electrode of claim 5.

9. The lithium secondary battery according to claim 8, wherein the lithium secondary battery is a lithium-sulfur battery.

10. The sulfur-carbon composite according to claim 1, wherein the coating is present on both the interior and the surface of the porous carbon material.

* * * * *